United States Patent [19]

Liou et al.

[11] Patent Number: 5,564,071
[45] Date of Patent: Oct. 8, 1996

[54] METHOD AND APPARATUS FOR MANAGING RADIO SYSTEM ATTRIBUTES FOR COMMUNICATION UNITS

[75] Inventors: Beesun Liou, Bartlett; Daniel J. McDonald, Cary, both of Ill.

[73] Assignee: Motorola, Inc., Schaumburg, Ill.

[21] Appl. No.: 297,342

[22] Filed: Aug. 29, 1994

[51] Int. Cl.$^6$ .................................................. H04B 17/00
[52] U.S. Cl. .................. 455/56.1; 455/67.1; 395/200.15
[58] Field of Search .................... 455/8, 14, 33.1, 455/33.2, 34.1, 56.1, 67.1; 340/825.08, 825.02; 395/200.15; 364/284

[56] References Cited

U.S. PATENT DOCUMENTS

| | | | |
|---|---|---|---|
| 5,077,828 | 12/1991 | Waldroup | 455/34.1 |
| 5,175,866 | 12/1992 | Childress et al. | 455/8 |
| 5,179,373 | 1/1993 | John | 455/56.1 |
| 5,222,248 | 6/1993 | McDonald et al. | 455/33.2 |
| 5,247,698 | 9/1993 | Sawyer et al. | 455/56.1 |
| 5,274,802 | 12/1993 | Altine | 455/33.1 |
| 5,276,442 | 1/1994 | Cree et al. | 370/92 |
| 5,329,574 | 7/1994 | Nielson et al. | 379/58 |
| 5,377,185 | 12/1994 | Bardusk | 455/33.1 |
| 5,392,449 | 2/1995 | Shaughnessy et al. | 455/8 |
| 5,446,884 | 8/1995 | Schwendemann et al. | 375/600 |
| 5,499,367 | 3/1996 | Bamford et al. | 395/600 |

Primary Examiner—Andrew Faile
Attorney, Agent, or Firm—Andrew S. Fuller

[57] ABSTRACT

A radio communication system (100) provides for management of system attributes for communication units. The system includes communication sites (111, 112, 113) managed at least in part by a central controller (110), and communication units (121, 122, 123, 124) affiliated with each communication site (111, 112, 113). Each communication site (111, 112, 113) maintains a site database (305) including attributes for affiliated communication units. The central controller (110) maintains a central database (205) which includes attributes of communication units affiliated with the communication sites managed by the central controller (110). The central controller (110) receives at least a subset of attributes from the site database (305) of a communication site, and updates the central database (205) accordingly.

8 Claims, 3 Drawing Sheets

METHOD AND APPARATUS FOR MANAGING RADIO SYSTEM ATTRIBUTES FOR COMMUNICATION UNITS

TECHNICAL FIELD

This invention relates in general to a radio communication system, and more particular, to the tracking of communication units within a multi-site trunked radio communication system.

BACKGROUND

Multi-site trunked communication systems are known. A typical system includes communication units, communication sites, communication resources, and a communication resources allocator or manager. Generally, the communication sites are geographically dispersed throughout the system, such that each site has a substantially distinct coverage area. A number of communication resources are assigned to each site. At least one communication resource per site is used as a control channel, while the remaining communication resources are used as voice and/or data channels. Base stations or repeaters are used to support the communication resources and are located at each site. The communication resources may be telephone connections, time division multiplexed (TDM) time slots, carrier frequencies, and/or frequency pairs. These resources are managed by the resource allocator, which is also referred to as a central controller.

The communication units, also called subscribers, can be arranged in talk groups and may be located anywhere within the coverage area of the system, i.e., the cumulative coverage area of all the sites within the system. A subscriber from a talk group may request a group call which allows all members of the same talk group that are located within the system to communicate with each other. The subscriber initiates this request for a group call by transmitting, via the control channel of the site with which it is associated, notification to the central controller. The central controller maintains a database of the subscribers within the system, the sites with which they are associated, and their membership within the talk group, among other information. Thus, the central controller is able to service the request for a group call by allocating communication resources at the various sites with which various members of the talk group are associated, so as to permit communications among members of the talk group. Generally, the information stored in the database of the central controller is maintained through communications between the central controller and each subscriber. As a subscriber travels throughout the coverage area of the system, so as to change its associated site, the subscriber communicates updated site association information to the central controller so that the central controller can maintain its database.

A problem arises when there is a failure or initialization at the central controller, and its database becomes obsolete or unusable. For example, if a central controller has an appreciable amount of down time, subscribers may change site affiliation, thus making at least some portions of the database obsolete. Generally, the central controller does not know which subscribers have changed affiliation, and thus must query all subscribers to get information needed to update the database. Similarly, if the information in the database is lost, the central controller must communicate with each subscriber to rebuild its database. This process can take a substantial amount of time during which the radio communication system is not fully operational.

It is desirable to have a radio communication system, such as a multi-site trunked system, which operates with minimum down time despite failures in any particular portion of the system. In a typical multi-site trunked system of the prior art, a central controller failure could result in significant down time. Therefore, an improved management approach is needed.

DETAILED DESCRIPTION OF THE PREFERRED EMBODIMENT

Figure 1:
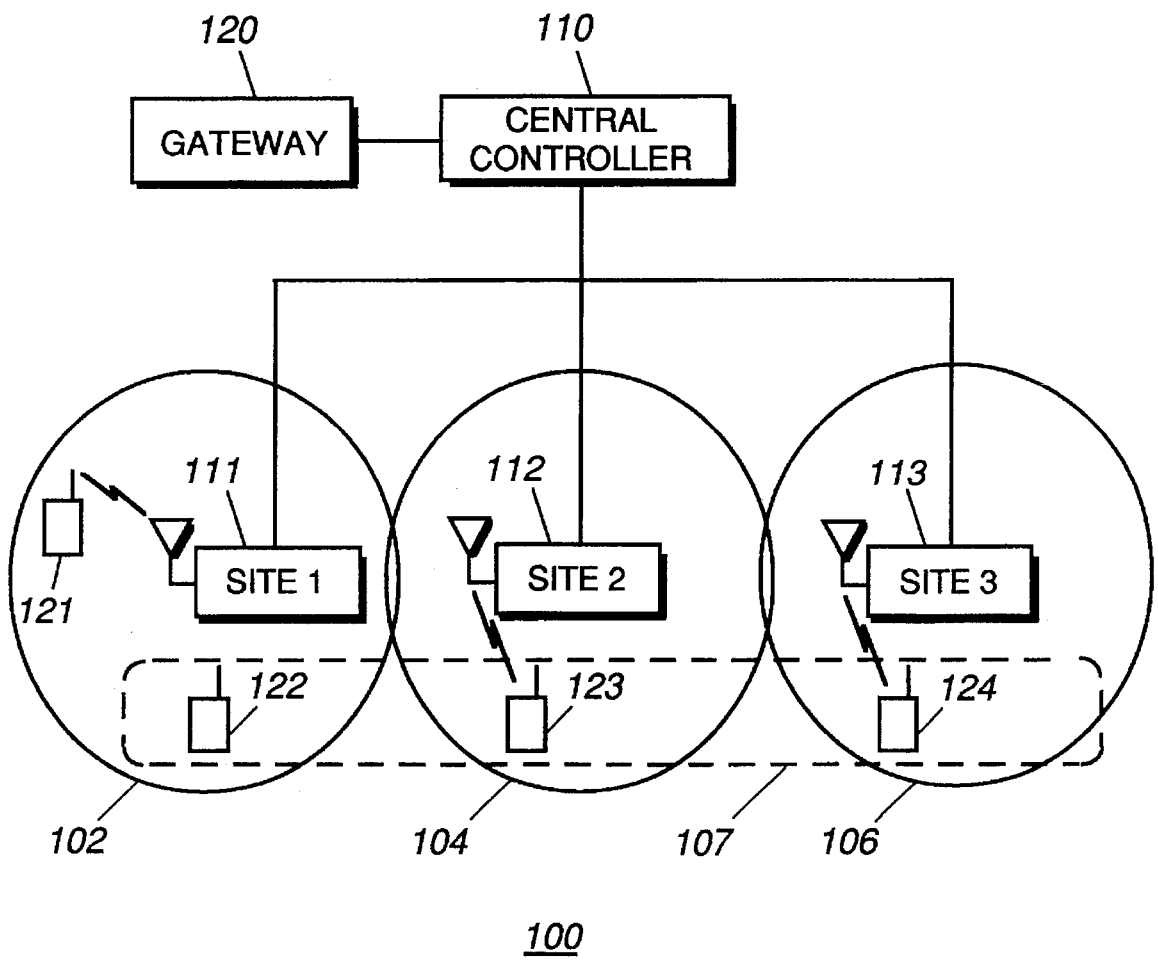
FIG. 1 is a block diagram of a radio communication system, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a multi-site trunked communication system 100 is shown in accordance with the present invention. The communication system includes a central controller 110, a plurality of trunked communication sites 111, 112, 113, and a plurality of communication units or subscriber units 121, 122, 123, 124. The communication system 100 spans a coverage area which includes the cumulative coverage area 102, 104, 106 of the sites 111, 112, 113, respectively. The central controller 110 manages communications among the communication units of the system, performing such functions as routing, resource management, and other managerial functions. For example, a communication unit 123 establishes a communication link with a second communication unit 124 by affiliating with a site 112, and by communicating with the central controller 110 through the site 112. The central controller 110 operates through the appropriate site 113 to complete the communication link to communication unit 124. The communication unit 123 may also initiate group wide communications among a talk group 107 which includes other communication units. The central controller 110 also provides access through a gateway 120 to other communication systems (not shown).

Figure 2:
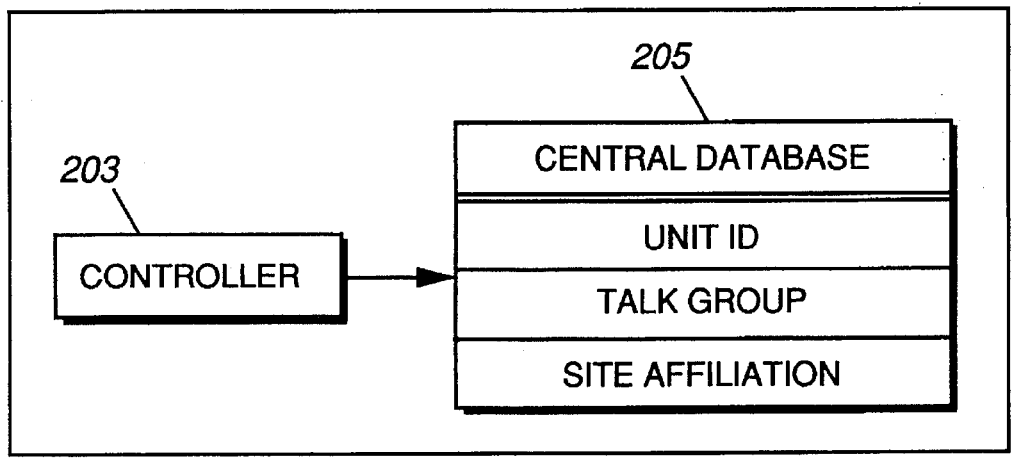
FIG. 2 is a block diagram of a central controller, in accordance with the present invention.

FIG. 2 is a block representation of the central controller 110, in accordance with the present invention. The central controller 110 maintains a central database 205 of management information for communication units within the system. The central database 205 comprises a unit identifier, talk group association, and site affiliation for each communication unit known to be participating in the communication system 100. A controller portion 203 is coupled to the central database 205 to provide operational control. The central controller 110 may be implemented using a Motorola Smart Zone Controller as is known in the art. The central controller 110 supports the communication units by allocating resources at the appropriate sites. For example, if a group call is initiated, the central controller allocates communication resources at the sites with which the members of the talk group are affiliated. Thus, the information stored at the central controller 110 is critical for the smooth operation of the communication system.

The information stored at the central controller 110 is maintained through communications with the communication units which periodically provide updated information as to the site affiliations, talk group memberships and other attributes. Generally, the communication units of the system are mobile and may change a site affiliation as they travel through the coverage area of the system. Additionally, a communication unit may be reconfigured to change talk group membership, identifier, and other critical information needed by the central controller 110 to support communication within the system. Thus, the communication units operate in a dynamic environment, and changes within the central controller 110 are frequent. When the central controller 110 is not available to receive updated communications from the communication units, information stored at the central controller 110 may become obsolete. The present invention provides an approach for reducing the time needed for a central controller to become fully operational after failure, initialization, and/or maintenance.

Figure 3:
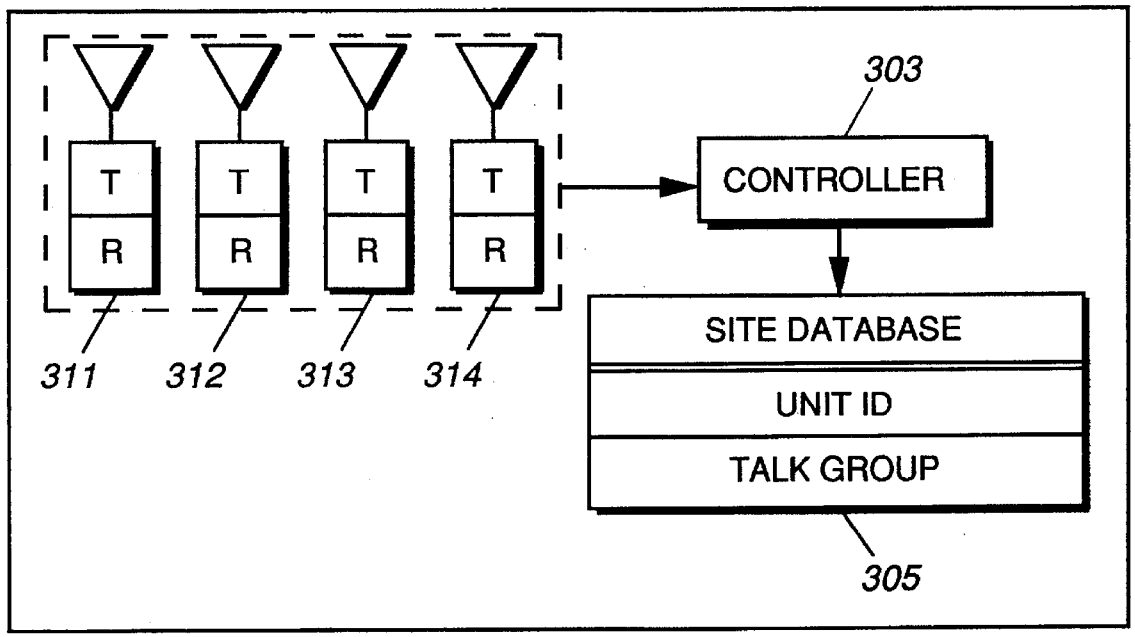
FIG. 3 is a block diagram of a site, in accordance with the present invention.

FIG. 3 is a block representation of a site, such as site 112, in accordance with the present invention. The site 112 includes a site controller 303 coupled to a plurality of base stations or repeaters 311, 312, 313, 314, each comprising transceivers. The site also has a site database 305 which includes a unit identifier and a talk group association for each communication unit known to be affiliated with the site. Generally, the information stored at the site database 305 is retrieved from individual communication units affiliated with the site. Particularly, when a communication unit wishes to be affiliated with the site, the communication unit transmits an affiliation command and corresponding affiliation information is stored in the site database 305. Site configurations may differ, but each site has the base components of a site database, a site controller, and one or more repeaters or base stations. The present invention incorporates the use of databases located at the sites, i.e., the site databases, to mitigate the effects of a central controller 110 failure or initialization. Mitigation is afforded by maintaining information on the communication units affiliated with each site, and by using this information to update the central database 205 as appropriate. The site database 305 is updated by the site 112 even when the central controller 110 is not available.

Figure 4:
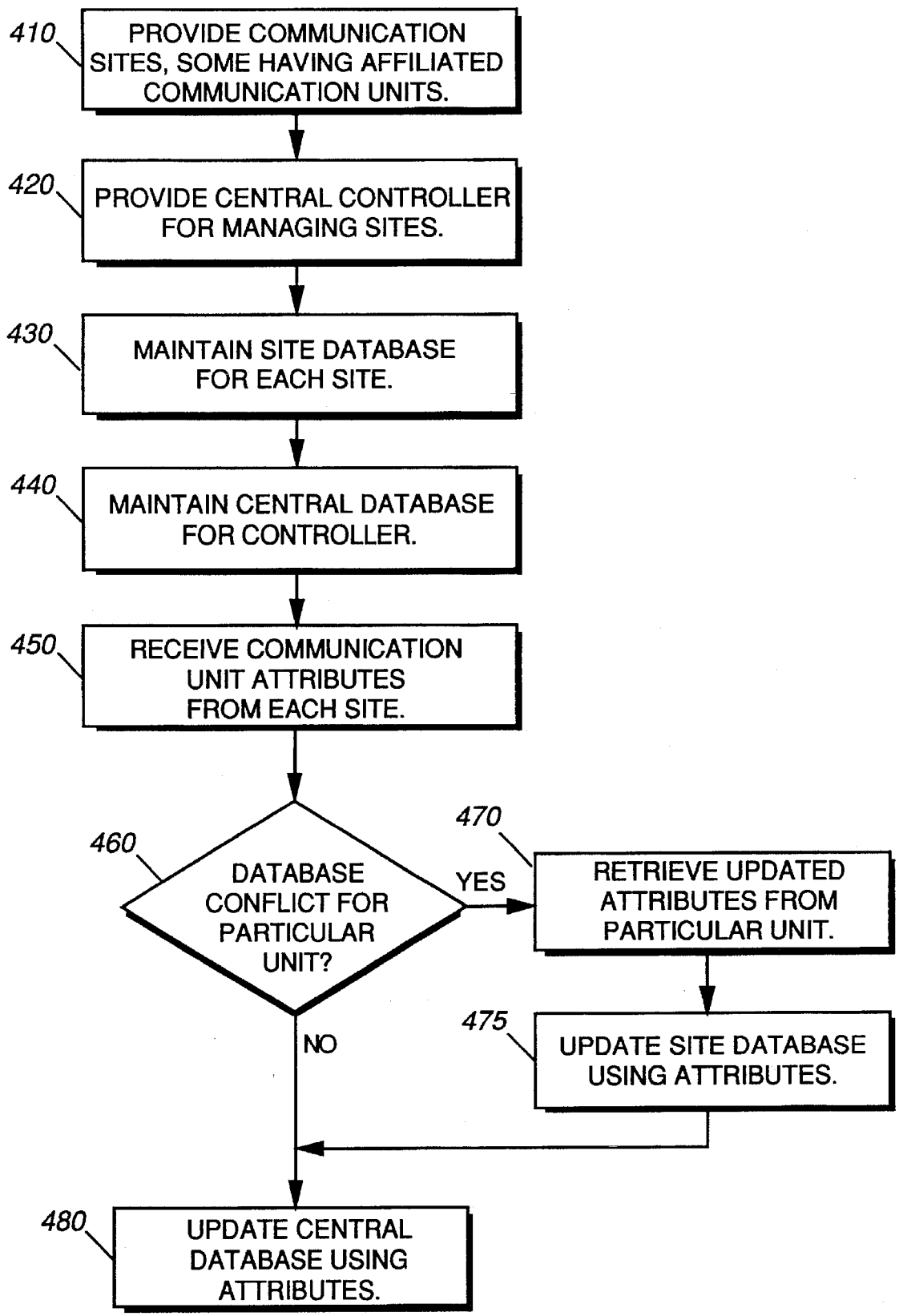
FIG. 4 is a summary of procedures for managing radio system attributes, in accordance with the present invention.

FIG. 4 is a summary of procedures used for managing the radio communication system, in accordance with the present invention. A radio system is provided which includes communication units, communication sites, and a central controller, steps 410, 420. At least some of the communication sites have affiliated communication units. The central controller manages the communication sites and communication among the communication units through their affiliated sites. A site database is maintained for each site and is typically physically present at each site, step 430. The site database generally contains a unit identifier for each communication unit affiliated with the site as well as any talk group association for a particular communication unit. The site database is maintained through communications with the communication unit and the central controller. When a communication unit wants to be affiliated with a site, it issues a site affiliation command which is processed at the site. The communication unit provides the attributes to the site, and the site database is updated accordingly. The site affiliation command is also routed to the central controller for appropriate processing. The site may also receive an indication from the central controller that a particular communication unit is no longer affiliated with that site. In this case, the site removes or otherwise updates the entry within the site database to reflect this condition.

The central database is maintained with information retrieved by the central controller from the site databases and/or using information received from the communication units via the sites, step 440. Generally, the central controller receives and processes communication requests from a communication unit. If the request indicates new attribute information, the new attribute information is stored in the central database. If there is a change in site affiliation, the central controller issues a command to the site with which the communication unit was previously affiliated, if any, to indicate that the communication unit is no longer affiliated with that site. Thus, the central controller maintains an up-to-date database containing the attributes of the communication units which is consistent with the information in the site databases.

Occasionally, as a result of central controller failure, initialization, or otherwise, there is an expectation that the information stored in the central database may be obsolete, inaccurate, or otherwise insufficient. In response, the central controller requests and receives at least a subset of communication unit attributes from each site, step 450, by issuing a command to the site which instructs the site to upload communication unit attributes, such as unit identifiers, site affiliation, and talk group associations. Typically, the site responds by uploading information which is retrieved from the site database. The central controller determines when it receives conflicting attributes for a particular communication unit from the site databases for at least two sites, step 460, which indicates that there is a database conflict. If no database conflict was detected, the central controller updates its database with the attribute information reported from the site, step 480. When a database conflict is detected, the controller retrieves updated attributes from the particular communication unit, step 470.

To retrieve updated attributes from a particular unit, the central controller initiates, through the sites reporting conflicting information, procedures to get updated attributes for the particular communication unit. Under these procedures, the central controller attempts to establish communication with a particular unit, by polling the communication unit through each site which reported conflicting information. Once communication is established with the particular communication unit, the central controller requests that the communication unit provide updated attributes. The site databases and the central database are updated with the updated attributes, steps 475, 480. The central controller issues commands to sites which have invalid information instructing these sites to remove the conflicting information from the sites database. The site responds by removing the identifier from the site database when there is an indication that the communication unit is no longer affiliated with the particular site, and by storing updated attributes where appropriate. Note that the communication unit may not respond to attempts by the central controller to establish communications. For example, the communication unit may be turned off, or may be outside the coverage range of the system. In such situations, the central controller instructs the sites with conflicting information to remove the communication unit from their site database, or otherwise update their site database. The central controller will also update the central database accordingly, such as by removing entries for the communication unit from the central database.

The present invention offers several advantages over the prior art. The central database provides ready access to system based attributes for the communication units associated with the system. Controller functions such as tracking, routing, and resource allocation, can be performed without delay. Site databases are maintained for the attributes of communication units associated with the respective site. The central database can be quickly rebuilt from the site databases to reduce system recovery time after a central controller failure, or when central controller initialization is required. Conflicting entries among site databases are resolved through the central controller to maintain database consistency.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for managing a radio communication system in a multi-site trunked environment, the method comprising the steps of:

providing a plurality of communication sites managed at least in part by a central controller;

providing at least one communication unit affiliated with each communication site;

maintaining, for each communication site, a site database including attributes for the at least one affiliated communication unit;

maintaining, for the central controller, a central database including attributes of communication units affiliated with the plurality of communication sites;

determining that the central database does not contain up-to-date information based on the central controller not being available to receive updated communications from the communication units;

building the central database from the respective site databases when the central database does not contain up-to-date information, including the steps of:

requesting, by the central controller, at least a subset of attributes from the site database for each communication site; and updating the central database using at least the subset of attributes received.

2. The method of claim 1, further comprising the steps of:

determining when the central controller receives conflicting attributes for a particular communication unit from the site databases for at least two sites;

initiating, through the at least two sites, procedures to get updated attributes for the particular communication unit; and updating the central database and the site databases for the at least two sites with the updated attributes.

3. The method of claim 2, wherein the step of initiating, comprises the steps of:

establishing communications with the particular communication unit, through at least one of the at least two communication sites;

requesting that the particular communication unit provide updated attributes when communications is established.

4. The method of claim 2, wherein the step of maintaining, for each communication site, a site database comprises the steps of:

storing an identifier for a particular communication unit in the site database for a particular site when the particular communication unit is affiliated with the particular site; and updating the site database for the particular site when the particular communication unit is no longer affiliated with the particular site.

5. The method of claim 4, wherein the step of updating the site database comprises the step of:

removing the identifier from the site database for the particular site when the particular communication unit is no longer affiliated with the particular site.

6. A method for managing a radio communication system having a plurality of subscriber units operable in a multi-site trunked environment, the method comprising the steps of:

providing a plurality of trunked communication sites, wherein at least some of the communications sites have at least one subscriber unit, selected from among the plurality of subscriber units, affiliated therewith;

providing a central controller for managing the plurality of trunked communication sites;

maintaining, at each communication site, a site database having attributes, including an identifier and talk group association, for the at least one affiliated subscriber unit;

maintaining, at the central controller, a central database having attributes, including identifiers, talk group associations, and site affiliation, for subscriber units affiliated with the plurality of trunked communication sites;

determining that the central database does not contain up-to-date information based on the central controller not being available to receive updated communications from the subscriber units;

building the central database from the respective site databases when the central database does not contain up-to-date information, including the steps of:

requesting and receiving, by the central controller, identifiers, talk group associations, and site affiliations for subscriber units, from each communication site;

determining that a database conflict exists when the central controller receives conflicting information for a particular subscriber unit, from at least two communication sites; and when a database conflict exists:

initiating, through the at least two communication sites, procedures to get updated attributes from the particular subscriber unit retrieving updated attributes from the particular subscriber unit;

updating the central database and the site databases for the at least two communication sites with the updated attributes.

7. The method of claim 6, wherein the step of maintaining, at each communication site, a site database comprises the steps of:

storing an identifier for a particular subscriber unit in the site database for a particular communication site when the particular subscriber unit is affiliated with the particular communication site; and updating the site database for the particular communication site when the particular subscriber unit is no longer affiliated with the particular communication site.

8. The method of claim 6, wherein the step of initiating, comprises the steps of:

establishing communications with the particular subscriber unit, through at least one of the at least two communication sites; and requesting that the particular subscriber unit provide updated attributes when communications is established.

* * * * *